(12) United States Patent
Francis et al.

(10) Patent No.: US 7,831,025 B1
(45) Date of Patent: Nov. 9, 2010

(54) METHOD AND SYSTEM FOR ADMINISTERING SUBJECTIVE LISTENING TEST TO REMOTE USERS

(75) Inventors: John D. Francis, Brooklyn, NY (US); Laurie F. Garrison, Oceanport, NJ (US); James H. James, Farmingdale, NJ (US)

(73) Assignee: AT&T Intellectual Property II, L.P., Reno, NV (US)

( * ) Notice: Subject to any disclaimer, the term of this patent is extended or adjusted under 35 U.S.C. 154(b) by 1177 days.

(21) Appl. No.: 11/434,473

(22) Filed: May 15, 2006

(51) Int. Cl.
*H04M 1/24* (2006.01)
*H04M 3/08* (2006.01)
*H04M 3/22* (2006.01)

(52) U.S. Cl. ................ 379/1.01; 379/22.02; 379/27.03; 704/224; 704/234

(58) Field of Classification Search ................ 379/1.01, 379/1.02, 9, 10.01, 10.03, 15.01, 18, 22.02, 379/22.07, 22.08, 23, 24, 32.01; 704/200, 704/201.1, 216, 217, 218, 221, 224, 234, 704/237, 239, 226, 233, 270; 370/250
See application file for complete search history.

(56) References Cited

U.S. PATENT DOCUMENTS

| 5,572,570 | A | * | 11/1996 | Kuenzig | 379/1.02 |
|---|---|---|---|---|---|
| 6,304,634 | B1 | * | 10/2001 | Hollier et al. | 379/22.02 |
| 6,477,492 | B1 | * | 11/2002 | Connor | 704/236 |
| 6,823,302 | B1 | * | 11/2004 | Atkinson et al. | 704/216 |
| 7,206,743 | B2 | * | 4/2007 | Bonnifait et al. | 704/270 |
| 2002/0097840 | A1 | * | 7/2002 | Hardy | 379/1.02 |
| 2002/0131604 | A1 | * | 9/2002 | Amine | 381/58 |
| 2005/0141493 | A1 | | 6/2005 | Hardy et al. | |
| 2006/0031469 | A1 | | 2/2006 | Clarke et al. | |
| 2006/0073786 | A1 | | 4/2006 | Sarkar | |
| 2006/0093094 | A1 | * | 5/2006 | Xing et al. | 379/1.02 |
| 2009/0097408 | A1 | * | 4/2009 | Corcoran | 370/250 |

* cited by examiner

*Primary Examiner*—Binh K Tieu

(57) ABSTRACT

A method and system for administering a subjective listening test to remote users. A user can participate in a subjective listening test, such as an MOS listening test, over a telephone call. The telephone call is received and audio recordings are sequentially played over the telephone call. Quality ratings corresponding to the audio recordings are input by the user over the telephone call. The user can input digits corresponding to the quality ratings. This allows a user to take part in a subjective listening test without traveling to a lab.

20 Claims, 2 Drawing Sheets

METHOD AND SYSTEM FOR ADMINISTERING SUBJECTIVE LISTENING TEST TO REMOTE USERS

BACKGROUND OF THE INVENTION

The present invention is generally directed to subjective listening tests. More specifically, the present invention is directed to a method and system for administering subjective listening tests to remote users.

For service providers providing voice communication services (telephone, cellular, Voice over Internet Protocol (VOIP), etc.), it is necessary to be able to assess the perceived quality of technologies and services by customers. Subjective listening tests are typically used for this purpose. A subjective listening test involves presenting test samples to customers and gathering the customers' opinions of the quality of the test samples. The test samples are typically made up of audio recordings that capture various conditions of interest, such as circuit noise or packet loss, or have been made over competing networks or new vendor equipment. Subjective listening tests can be used to perform vendor equipment evaluation and certification, competitive assessment, service troubleshooting, network and service planning, and to test emerging technologies, such as VoIP.

A common type of subjective listening test is a Mean Opinion Score (MOS) listening test. MOS listening tests provide a numerical measure of the perceived quality of voice communications delivered using a particular service or technology. In MOS listening tests, customers ("users") listen to multiple recordings of telephone network connections. After each recording is played, the users rate how the recording sounds to them. The users rate the recordings using a rating scale of "5", "4", "3", "2", and "1", meaning excellent, good, fair, poor, and bad, respectively. For each recording, the ratings for all of the users are averaged to determine the MOS for the recording. The various recordings can be used to test different systems (i.e., VoIP, cellular, PSTN), equipment, software, or different conditions (i.e., packet loss circuit noise, echo noise) in a system.

Conventionally, MOS listening tests are performed in a lab setting. In order to perform MOS listening tests, a lab must be equipped with expensive, specialized equipment that is used to simulate a typical telephone and access network of users. This lab must have equipment to play the sample recordings to users, collect user ratings, and record the data in a useable format. For example, a computer system plays the recordings, which are sent to an attenuator to control the level of the recordings. The recordings are then sent to a splitter which sends the recordings to the different users. The users listen to the recordings over hand sets that are calibrated so each user hears the same thing. Accordingly, each user hears the same recording at the same level at the same time. The users enter their ratings using a touch screen or the like, and the ratings are saved and averaged on a computer system.

Due to the cost of purchasing and calibrating the equipment, it is expensive to set up and maintain a lab for MOS testing. Furthermore, users must be paid not only a fee for their services in completing the MOS testing, but also a premium for their travel to the lab site. Additionally, scheduling users to come to a lab for MOS testing and running an MOS listening test for a group of users is time consuming.

In addition to the MOS listening test, a variety of other subjective listening tests can be used to assess user opinion of voice communication technologies and services. For example, a paired-comparison test directly compares two audio samples, a Modified Rhyme Test (MRT) measures user opinion of intelligibility of audio samples, and a Degradation Category Rating (DCR) test rates a user annoyance level of distortion or other impairments. Similar to the MOS listening test, other subjective listening tests are conventionally performed in a lab setting are can be costly and inefficient to administer.

BRIEF SUMMARY OF THE INVENTION

In order to increase the efficiency and decrease the costs of subjective listening tests, it is desirable to allow users to perform subjective listening tests remotely. Accordingly, the present invention is directed to administering subjective listening tests to remote users. This is accomplished by allowing users to complete a subjective listening test over a telephone call. Users can call from any location and any time to take part in a subjective listening test.

In an embodiment of the present invention, a computer system answers a user telephone call and administers a subjective listening test, such as an MOS listening test, to the user via the telephone call. The computer system is configured to play audio recordings to the user over a telephone line, and receive user ratings over the telephone line. The user ratings can be received in the form of dual tone multi-frequency digits corresponding to a perceived quality of an audio recording played to a user. The user ratings received over the telephone line are stored, and multiple users' ratings of an audio recording are averaged to calculate the MOS of the audio recording.

The computer system may measure characteristics, such as circuit noise or loudness, of the access network of the user. The computer system may measure these characteristics based on test signals input by the user. These characteristics can be used when analyzing the results of an MOS listening test. Also, the computer system may adjust playback settings of the audio recordings based on the measured characteristics.

The present invention allows service providers to assess customer opinion in a simple, inexpensive, and efficient manner, by allowing customers to participate from their homes, offices, etc. In addition to increasing efficiency and decreasing costs, the present invention can increase the variety and scope of the customer opinions received using subjective listening tests.

These and other advantages of the invention will be apparent to those of ordinary skill in the art by reference to the following detailed description and the accompanying drawings.

DETAILED DESCRIPTION

In accordance with the present invention, a subjective listening test can be administered to a user at a remote location. As used herein, the term "user" refers to a customer or subject that is taking the subjective listening test. In accordance with the present invention, a user can participate in a subjective listening test via a telephone call from any location, such as the user's home, office, etc. As described herein, the present invention is implemented to administer a Mean Opinion Score (MOS) listening test. However, the present invention is not limited to an MOS listening test, and can be used to administer any type of subjective listening test, such as, a paired-comparison test, a MRT test, a DCR test, etc.

In an embodiment of the present invention a computer system receives a telephone call from a user, and automatically administers an MOS listening test to the user via the received telephone call. That is, the computer system can play audio samples to the user and receive ratings from the user over a telephone line.

Figure 1:
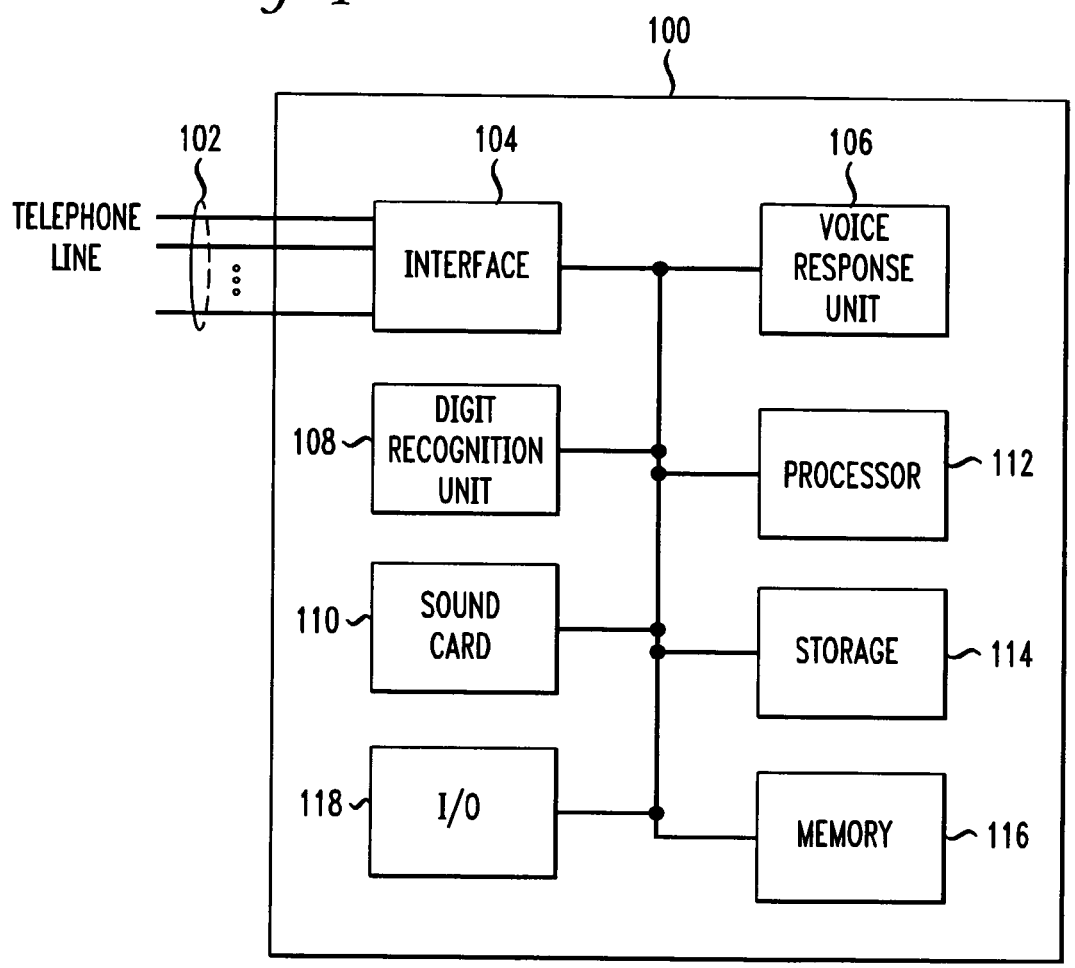
FIG. 1 illustrates a computer system configured to perform an embodiment of the present invention.

FIG. 1 illustrates a computer system 100 configured to perform a method in accordance with an embodiment of the present invention. The computer system 100 contains a processor 112 which controls the overall operation of the computer system 100 by executing computer program instructions which define such operation. The computer program instructions may be stored in a storage device 114 (e.g., magnetic disk) and loaded into memory 116 when execution of the computer program instructions is desired. Thus, a method of administering an MOS listening test can be defined by computer program instructions stored in the memory 116 and/or storage 114 and controlled by the processor 112 executing the computer program instructions. The computer system 100 can also include input/output 118 which represents devices which allow for direct interaction with the computer system 100 (e.g., display, keyboard, mouse, speakers, buttons, etc.). One skilled in the art will recognize that an implementation of an actual computer will contain other components as well, and that FIG. 1 is a high level representation of some of the components of such a computer for illustrative purposes.

Figure 2:
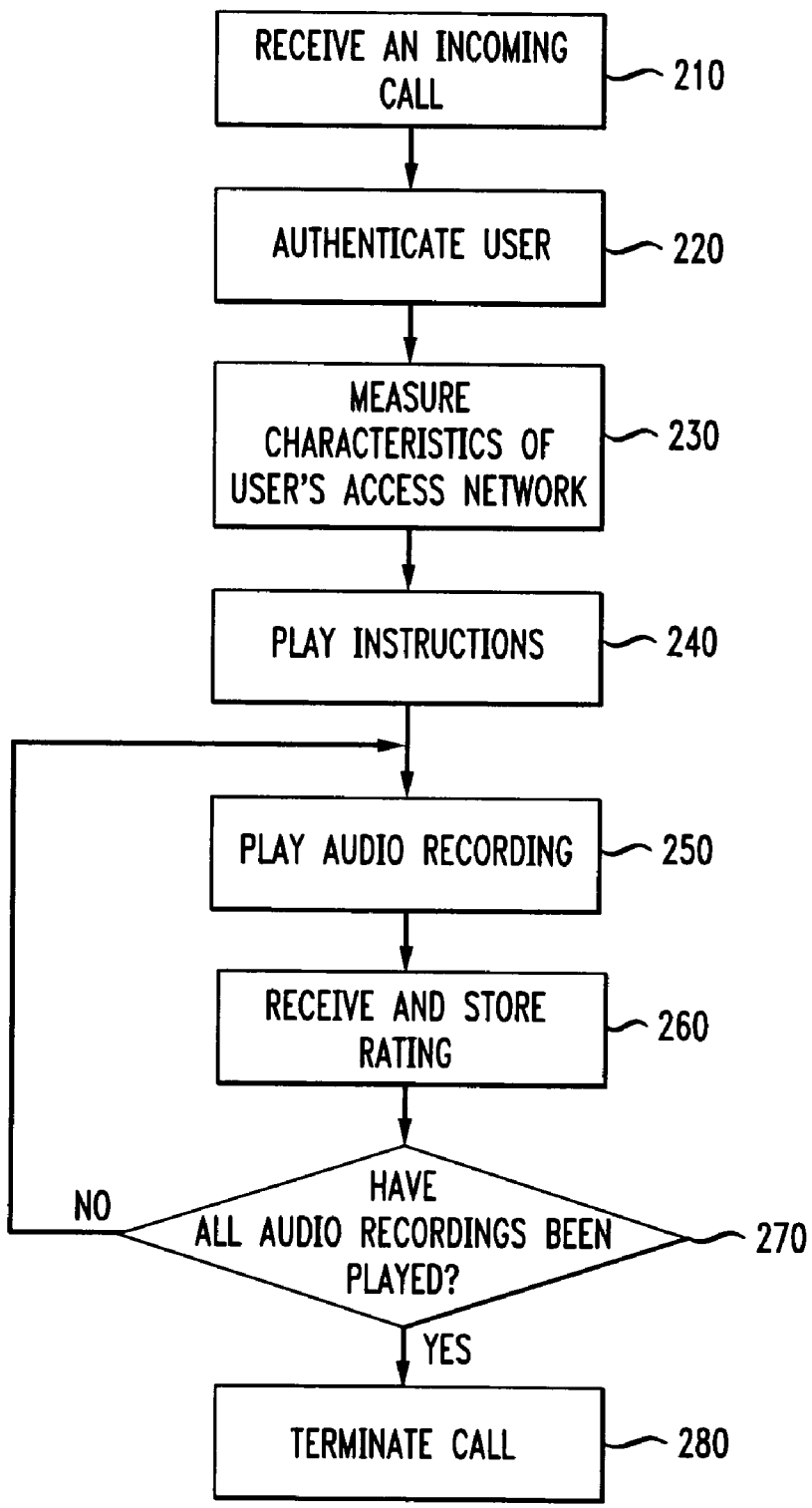
FIG. 2 illustrates a method of administering a Mean Opinion Score (MOS) listening test according to an embodiment of the present invention.

FIG. 2 illustrates a method of administering an MOS listening test to a remote user according to an embodiment of the present invention. This method will be described while referring to FIGS. 1 and 2.

At step 210, an incoming telephone call from a user is received. Users can be given a telephone number to call, and can call whenever it is convenient. It is possible that a toll free number (e.g., "800 number") could be used by a user to call in for MOS testing. A user can use any type of access network (i.e., PSTN, cellular network, VoIP network) to call in for MOS testing, subject to testing requirements. When a user calls in to participate in an MOS listening test, it is possible that a greeting is played for the user.

The computer system 100 is equipped with an interface 104 which is capable of receiving telephone call. For example, the interface 104 may be a line card having multiple ports in order to connect to multiple telephone lines 102. This allows the interface 104 to receive multiple telephone calls concurrently, such that the computer system 100 can administer MOS listening tests to multiple users simultaneously. The interface 104 is capable of receiving calls placed by users using any type of access network (i.e., PSTN, cellular, VoIP).

The computer system 100 is also equipped with a voice response unit 106. The voice response unit 106 communicates with the user over the telephone call using pre-recorded words or phrases stored in a database in the storage 114. The voice response unit 106 strings together the pre-recorded words or phrases to respond to input from the user. In one embodiment, the voice response unit 106 plays a pre-recorded greeting to the user when the interface 104 answers the incoming telephone call.

At step 220, a user is authenticated. Before the user calls in for MOS testing, the user can be given an ID code. In order to authenticate the user, the voice response unit 106 asks the user to input the ID code. The user then enters the ID code using the keypad of the user's telephone. A digit recognition unit 108 recognizes digits input from the keypad based on the dual tone multi-frequency (DTMF) of the digits. DTMF is a system used in touchtone telephones in which each DTMF digit is assigned a specific frequency consisting of two separate tones such that the DTMF digits are easily identifiable.

When the digit recognition unit 108 determines the ID code entered by the user, the ID code is then compared to a database of valid ID codes stored in the storage 114 to determine whether the ID code is valid. It is possible that the voice response unit 106 repeats the ID code to the user to ensure that the user entered the ID code correctly. If the ID code entered by the user is invalid, the voice response unit 106 can instruct the user to re-input the ID code or instruct the user to contact a service provider who is conducting the MOS testing.

At step 230, characteristics of the access network of the user can be measured based on test signals input by the user. For example, the noise and loudness levels of the user's access network can be measured by instructing the user to input one or more predetermined DTMF digits on the keypad of the user's telephone. The loudness of the access network can be evaluated by measuring the level of the input DTMF digits. Since the frequency and the standard levels of the DTMF digits are known, it is possible to compare the level of the input DTMF digits with the known standard level of the DTMF digits. The circuit noise can be measured by measuring the level of the noise during silent periods before and after the input DTMF digits. As described above, DTMF digits are used as test signals to measure noise and loudness levels. However, the present invention is not limited thereto, and various types of test signals, such as a frequency sweep, a single tone, proprietary test signals, or user speech can be used. The present invention is not limited to measuring noise and loudness levels. Accordingly, other characteristics of the access network of the user, such as frequency response, can also be measured using the input test signals. It is possible that a multiple types of test signals are input by the user in order to measure a variety of characteristics of the access network of the user.

The measured characteristics, such as the noise and loudness levels, can be stored, for example, at the storage 114 of the computer system 100. These characteristics can be used in analyzing the results of the MOS listening test. These characteristics can also be used during the MOS listening test to adjust levels of audio recordings played in the MOS listening test.

At step 240, instructions are played to the user over the telephone. For example, the voice response unit 106 can play instructions to the user. The instructions can explain how the MOS listening test works, including the MOS rating scale to be used by the user for rating audio recordings. The rating scale to be used by the user can be a standard MOS rating scale in which, the ratings 5, 4, 3, 2, and 1 correspond to ratings of excellent, good, fair, poor, and bad, respectively.

At step 250, an audio recording is played to the user over the telephone. An MOS listening test can include multiple audio recordings to be played to a user. The audio recordings can be recorded over any service (VoIP, cellular, etc.) or equipment that a service provider wishes to test. The audio recordings can also be recorded to capture specific conditions (percentage of packet loss, noise level, etc.) that the service provider wishes to test.

The audio recordings can be stored at the storage 114 of the computer system 100. The computer system includes a sound card 110 to control the sound quality and playback level of an audio recording when the audio recording is played to a user over the telephone. The sound card 110 can be a high quality sound card to ensure that any impairments or distortions heard by a user are on the audio recordings, and not added by the sound card 110. According to an embodiment of the present invention, the sound card 110 can adjust the playback level of an audio recording based on the noise and loudness levels measured at step 230 to compensate for the measured noise and loudness levels.

After an audio recording is played, the user is prompted to enter a rating corresponding to the user's perceived quality of the audio recording. The user can be prompted by a "beep". The user enters a digit (1-5) on the keypad of the user's telephone to rate the audio recording. At step 260, the user's rating of the audio recording is received and stored. When a user enters a digits corresponding to a rating, the digit recognition unit 108 recognizes the digit that was entered. In one embodiment, if the digit is valid (i.e., 1-5), the digit is stored at the storage 114 as the rating for the corresponding audio sample, and if the digit is not valid, the voice response unit 106 asks the user to re-enter the rating.

At step 270, it is determined whether all audio recordings have been played. If all of the audio recordings stored at the storage 114 have been played, the method proceeds to step 280. If there are audio recordings that have not yet been played, the method returns to step 250. Accordingly, the audio recordings stored at the storage 114 are sequentially played over the telephone (step 250), and the ratings corresponding to the audio recordings are sequentially received and stored (step 260).

At step 280, the telephone call with the user is terminated. After the ratings for all of the audio recordings are stored at the storage 114, the MOS listening test is complete and the interface 104 terminates the telephone call with the user.

When MOS listening tests are performed using the method described above for multiple users, the user ratings from multiple users corresponding to an audio recording are averaged to calculate the MOS for that audio recording. Since different users can call in to participate in the MOS testing at different times, it is possible that the computer system 100 could keep a running MOS for each audio sample, and recalculate the running MOS upon receiving a rating for the audio sample from a user over the telephone.

As illustrated in FIG. 1, the computer system 100 includes a digit recognition unit 108, which recognizes digits entered by a user over a telephone call. The computer system 100 may alternatively or additionally include a speech recognition unit capable of recognizing spoken user input. Accordingly, a user may speak the ratings, ID code, and any other requested user input over the telephone instead of entering digits.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method, comprising:
   receiving an incoming a telephone call from a user; and
   administering a subjective listening test to the user via the telephone call, the administering step further comprises:
   measuring characteristics of the telephone call based on at least one test signal;
   playing a plurality of audio recordings via the telephone call;
   adjusting playback levels of the plurality audio recordings based on the measured characteristics;
   receiving a rating for each of the plurality audio recordings via the telephone call, the rating corresponding to the user's perceived quality of each of the plurality of audio recordings.

2. The method of claim 1, wherein said measuring step comprises:
   receiving the at least one test signal via said the telephone call.

3. The method of claim 2, wherein the at least one test signal comprises at least one DTMF digit.

4. The method of claim 1, wherein the administering step further comprises:
   storing the measured characteristics of the telephone call.

5. The method of claim 1, wherein the characteristics comprise noise and loudness levels of the telephone call.

6. The method of claim 1, wherein the subjective listening test comprises a Mean Opinion Score (MOS) listening test.

7. The method of claim 6, wherein the administering step comprises:
   sequentially playing a the plurality of audio recordings via the telephone call.

8. The method of claim 7, wherein the step of receiving a rating comprises:
   receiving a dual tone multi-frequency (DTMF) digit via the telephone call in response to each of the sequentially played audio recordings.

9. The method of claim 7, wherein the administering step further comprises:
   storing each received rating.

10. The method of claim 7, further comprising:
    updating a stored MOS value for an audio recording using a received user rating corresponding to the audio recording.

11. The method of claim 1, wherein the administering step comprises:
    receiving a user ID from the user via the telephone call; and
    validating the user based on the received user ID.

12. The method of claim 1, wherein the administering step comprises:
    playing instructions explaining the subjective listening test via the telephone call; and
    executing the subjective listening test via the telephone call as explained in the instructions.

13. The method of claim 1, wherein:
    the receiving step comprises receiving the telephone call from a user via a first access network; and
    the administering step comprises testing a quality of a second access network via said telephone call using audio recordings of the second access network.

14. The method of claim 1, wherein the subjective listening test comprises one of a Mean Opinion Score (MOS) listening test, a paired-comparison test, a Modified Rhyme Test (MRT), and a Degradation Category Rating (DCR) test.

15. A system comprising:
    means for receiving a telephone call;
    means for administering a subjective listening test via the telephone call, the means for administering a subject listening test further comprises:
    means for measuring characteristics of the telephone call based on at least one test signal;

means for playing a plurality of audio recordings via the telephone call;
means for adjusting playback levels of the plurality audio recordings based on the measured characteristics;
means for receiving a rating for each of the plurality audio recordings via the telephone call, the rating corresponding to a perceived quality of each of the plurality of audio recordings.

16. The system of claim 15, wherein the means for administering comprises:
means for sequentially playing a the plurality of audio recordings via the telephone call.

17. The system of claim 16, further comprising:
means for storing the quality ratings.

18. The system of claim 15, further comprising:
means for receiving user input via the telephone call; and
means for responding to the user input.

19. The system of claim 18, wherein the means for receiving user input comprises:
means for recognizing digits input via the telephone call.

20. The system of claim 18, wherein the means for receiving user input comprises:
means for recognizing speech via the telephone call.

\* \* \* \* \*